United States Patent Office 3,123,789
Patented Mar. 3, 1964

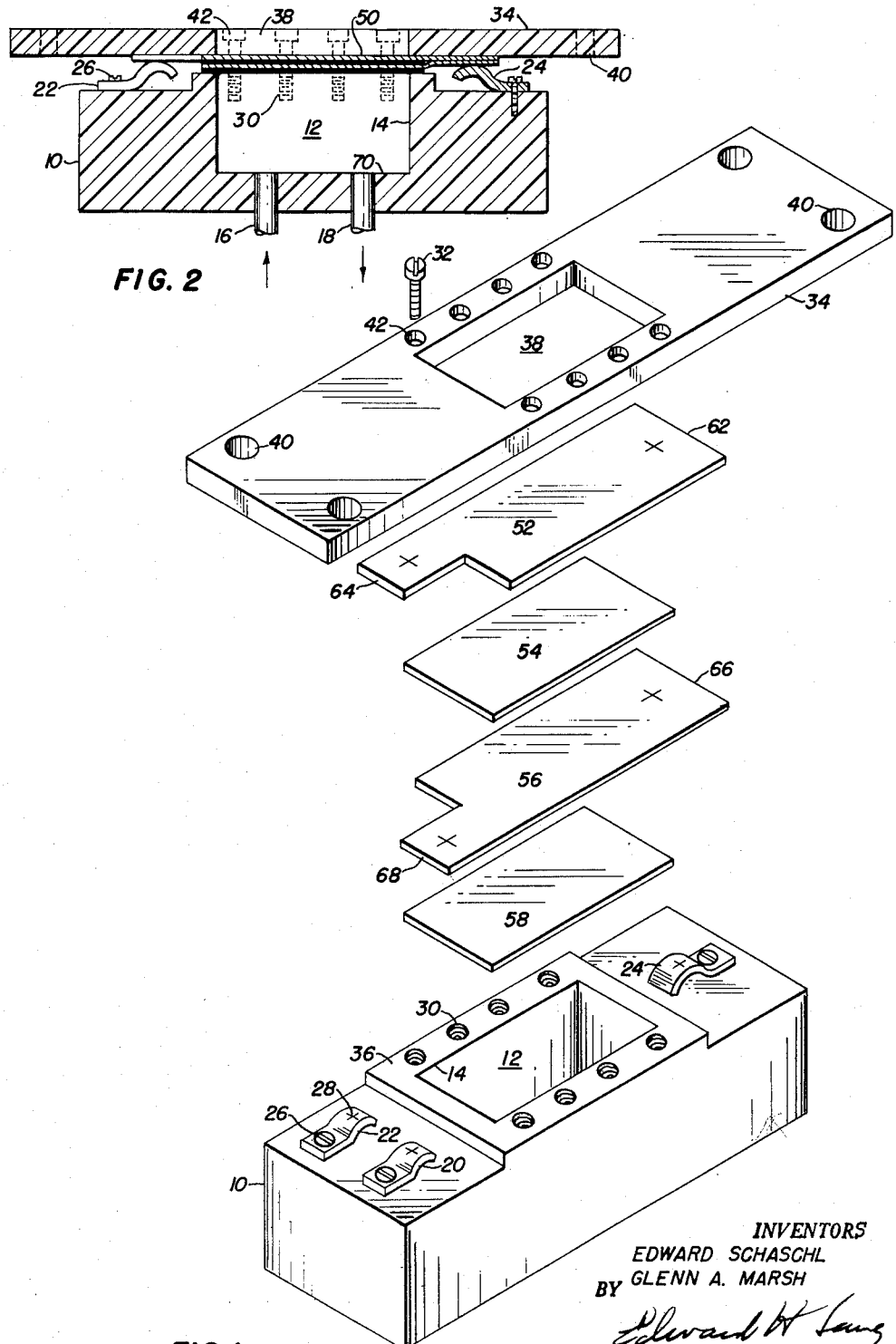

3,123,789
CORROSION TEST APPARATUS
Edward Schaschl and Glenn A. Marsh, Crystal Lake, Ill., assignors to The Pure Oil Company, Chicago, Ill., a corporation of Ohio
Filed Dec. 30, 1960, Ser. No. 79,888
9 Claims. (Cl. 338—13)

This invention relates to a temperature-controlled corrosion-test device and, more particularly, to a corrosion-test device for use in investigating corrosion phenomena related to the metal walls of heating or cooling equipment.

In many instances it is desirable to determine the corrosion rates of metals in equipment where wall temperatures are significantly different from the bulk temperatures, such as in heat exchangers, furnace flues, valve rocker-arm chambers of engines, and so forth. In these instances, the difference between the temperature of the metal and the temperature of the fluid in contact therewith can affect the rate of corrosive attack. For example, in the flues of furnaces and the valve rocker-arm chambers of engines, the cooling of exterior metal walls by air or water, causes condensation of corrosive constituents on the interior metal surface. Then too, the metal walls of the tubes and shell in a heat exchanger may be hotter or colder than the bulk temperature of the liquid or gas in contact therewith, and this can greatly aggravate corrosion.

As another example, phosphorous pentasulfide can be cooled through a stainless steel kettle without rapid corrosion of the stainless steel, but heating the phosphorous pentasulfide through the stainless steel causes very rapid attack of the metal. It is apparent that conventional corrosion-test probes, which are merely inserted in the environment under study and obtain the temperature of the environment, cannot be used to precisely determine the corrosion rate of the wall of the containing vessel.

The instant invention relates to a temperature-controlled corrosion-test probe providing means whereby conditions of corrosion can be duplicated, that is, the metal wall or member under study can be either a cooling or a heating surface, thus permitting more meaningful determinations of corrosion rates. The prior art has proposed a cell which utilizes a heating or cooling medium which is passed through a chamber which houses corrosion-test elements which are made of the material of construction under study. The thermal conditions within the chamber are adjusted to duplicate various combinations of conditions which the material of construction experiences when utilized as the body of a heat exchanger, furnace flue, etc., or the wall of a valve rocker-arm chamber, and so forth. This prior art device includes one corrosion-test element which simulates a portion of a confining wall through which the heat is transferred to the environment under study, and a second test element disposed in contact with the chamber housing to permit the measurement of the rate of corrosion of the test element by prior art resistance-change techniques.

Methods have been devised which make use of the correlation between change in electrical conductivity and change in cross-sectional area to determine the rate of corrosion of materials of construction in a corrosive environment though the use of two elements connected to electronic resistance-change meters. These devices employ resistance bridges to indicate quantitatively changes in physical characteristics which cannot be conveniently measured by other methods. One application of such a device is described in a copending application of the instant inventors, Serial No. 528,032, filed August 12, 1955, and relates to the obtaining of automatic temperature compensation in a resistance-change, corrosion-measurement device. In the apparatus of the named application, one of the elements is insulated from the corrosive environment by means of a suitable protective coating. The other element is exposed to the corrosive environment, and both elements are connected so as to comprise one-half of a typical resistance bridge. Suitable electrical connections are made with the other half of the bridge, which is placed outside of the corrosive environment along with the power supply to the bridge and an appropriate electrical meter, such as a galvanometer, which functions as a null detector. Loss of metal on the unprotected specimen induces small increases in resistance in the circuit which are correlated with metal loss by appropriate formulas described in the application.

In Patent No. 2,830,265, by Lynn E. Ellison, there is described an electronic apparatus for conveniently detecting and measuring changes in resistance which provides for the direct reading of the rate of corrosion of the exposed element. The corrosion-test cell of the present invention may be used in conjunction with the electronic circuits described in the foregoing patent. The automatic temperature-compensation feature is dependent upon the exposed test element and the protected compensating element being subjected to the same conditions of temperature fluctuation, so that while the temperature of the elements may increase or decrease, the change will be the same for each element.

The afore-described prior art device for measuring the corrosion rate of a test element which acts as a portion of a heat-transfer wall between a test environment and a heating or cooling fluid, includes a compensating element for the purpose of obtaining automatic temperature compensation in the resistance-change measurement of the rate of corrosion of the test element. The compensating element, however, being supported in exposure to the heating and cooling fluid, but in contact with the supporting housing, fails in fact to provide adequate temperature compensation under many conditions of actual use, because, for example, the compensating element is influenced by changes in ambient temperatures, whereas the test element is not. Moreover, changes in temperature of the test environment directly influence the temperature of the test element, but only remotely affect the temperature of the compensating element. It has further been found that the test element responds much more quickly to changes in temperature of the controlled fluid than does the compensating element. For these reasons, the temperature-compensation feature of the prior art cells has been found to be unsatisfactory for many test purposes.

It becomes therefore a primary object of this invention to provide an improved thermally controlled, corrosion-test device.

Another object of this invention is to provide a corrosion-test device for use in investigating corrosion phenomenon related to the metal walls of heating and cooling equipment, which test device will provide satisfactory automatic temperature-change compensation for a wide variety of actual test applications.

Another object of this invention is to provide an improved corrosion-test device adapted to duplicate the temperature and heat-transfer conditions affecting a material of construction while simultaneously subjecting the material of construction to a corrosive environment.

Still another object of this invention is to provide an improved apparatus for measuring the corrosion rate of the material of construction by subjecting a specimen of the material of construction to contact with a corrosive environment, adjusting the temperatures of fluids in contact with the specimen to simulate actual service conditions of heating and cooling, and measuring the rate of corrosion of the specimen.

This invention is best described with reference to the drawings, of which:

FIGURE 1 is an exploded view, in perspective, of the apparatus of this invention; and FIGURE 2 is a front elevational view, in section, of the apparatus depicted in FIGURE 1.

Referring to the drawing, housing 10, which is fabricated of a non-conducting, non-corrosive plastic material such as Bakelite, is provided with a hollow interior 12 and an opening 14. Fluid inlet 16, and outlet 18, communicate with the hollow interior 12 of the housing and provide means for circulating cooling or heating fluid within the housing interior. Three electrical terminals 20, 22, and 24, are secured to housing 10 by means of screws such as screw 26. Each terminal has a contact surface, such as surface 28 of terminal 22, adapted for making connection to a test panel. The housing is provided with threaded holes such as holes 30 for receiving bolts such as bolt 32, by means of which slotted coverplate 34 is secured to housing 10, as shown in FIGURE 2. Cover plate 34 is fabricated of a non-conducting, non-corrosive plastic, such as Bakelite, and has a flat lower surface, not shown, adapted to mate with flat upper surface 36 of housing 10. Cover plate 34 contains a rectangular slot 38 which registers with the rectangular opening 14 in housing 10 when the cover plate is bolted in place against the housing. Corner holes 40 are adapted to receive bolts by means of which the cover plate and attached housing may be secured to a test device, for example, the wall of a heat exchanger. The holes 42 of cover plate 34 will preferably be counterbored to receive the head portion of bolts which secure the cover plate to housing 10.

A test panel 50 is fabricated of test element 52, compensating element 56, and electrically insulating layers 54 and 58. These elements and layers, which are shown in the exploded view, are arranged in sandwich-like configuration, so that test element 52 lies against the bottom surface of cover plate 34 when the cover plate is secured to the housing 10. Tightening of the bolts, such as bolt 32, to hold the cover plate against the housing compresses the sheet-like elements and electrically insulating layers which comprise test panel 50 into a single unit, as shown in FIGURE 2. Test element 52, which is fabricated of the electrically conductive, corrodible material which is to be subjected to test conditions existing within the environment under study, is provided with a contact end 62 and a contact protuberance 64. Compensating specimen 56 is similarly provided with a contact end 66 and a contact protuberance 68. The test element and compensating element will preferably be fabricated of the same material of construction, such as steel, and will preferably, though not necessarily, be identical in physical dimensions. It will be noted that the protuberances 64 and 68 lie at opposite sides of the same end of the test panel. Thus protuberance 64 is adapted to contact terminal 22, while protuberance 68 is adapted to contact terminal 20. The contact end of compensating element 56 will contact terminal 24. The test element and compensating element are thin, sheetlike and flexible. Accordingly, when compressed by tightening of the bolts which secure the cover plate 34 to the housing 10, the test and compensating elements will deflect at their terminal portions, as shown in FIGURE 2, whereby the protuberances 64 and 68 are compressed between the flexible terminals and the cover plate, and the contact end of compensating element 56 deflects upward to the contact end of test element 52. Accordingly, the contact ends of the test element and compensating element touch each other and are electrically connected, and are in electrical connection with terminal 24 when the device is assembled. Electrically insulating layers 54 and 58 necessarily also have thermally insulating properties. These layers may be fabricated of any suitable insulating material, but preferably are fabricated of a Teflon (tetrafluoroethylene plastic) or vinyl plastic tape. The use of such tapes is advantageous in that they possess adhesive as well as insulating properties, and may be conveniently applied to metallic test and compensating elements. Moreover, the adhesive qualities of these materials provide a unitary test panel which is convenient to handle. The insulating layers 54 and 58 are shorter than the test element or compensating element, as shown. Thus contact areas are provided at ends 62 and 66 of the test and compensating elements, respectively, this zone of contact conveniently being a quarter- or half-inch in length. If desired, the test element and compensating element may be soldered together at this point. The insulating layers are preferably of the same width as the test and compensating elements, and are of such dimensions as to cover the rectangular opening 14 in housing 10. It will be apparent that when the apparatus is assembled, the test element 52 serves as a closure for the slot 38 of cover plate 34, and the test panel serves as a seal for opening 14 of housing 10, to render the housing fluid tight. It will further be evident that assembly of the apparatus automatically provides electrical connection to the protuberances and contact ends of the test and compensating elements, and electrically connects the contact ends together.

As a specific example of the use of the apparatus of this invention, the test assembly is assembled as depicted in FIGURE 2, and the device is mounted by means of four bolts to the external surface of a reaction kettle. The kettle wall is provided with a rectangular opening corresponding dimensionally to rectangular slot 38. The kettle contains phosphorous pentasulfide to which heat is being applied and which is at a temperature of 300° C. Steam, at a temperature of 350° C. is circulated through inlet 16 to the housing interior 12, and outward through outlet 18. The test element and compensating element employed are fabricated of a stainless steel substantially identical with that from which the kettle wall is made. The test element and compensating element are separated by a layer of Teflon tape, and another layer of Teflon tape is placed along the lower surface of the compensating element, between the compensating element and the housing. Electrical connection is made from the terminals 20, 22, and 24 to an electronic measuring system similar to that described in U.S. Patent No. 2,830,265. After equilibrium temperature conditions are obtained, the measuring instrument is balanced. Test conditions are maintained for a period of five hours, at which time the extent of corrosion of the test element is read directly from the meter of the electronic instrument, and the test is discontinued.

In order to determine quantitatively the accuracy of the test device of this invention under actual operating conditions, in comparison with a test cell of the prior art which comprised a single test element supported across a housing opening, and a compensating element supported adjacent to the housing interior surface, which would correspond to surface 70 of FIGURE 2, the following experiment was performed. The prior art cell and the device of this invention were connected in series with a water heater and a water source, so that hot water at the same temperature was supplied to each cell. The test element of each cell was exposed to a hot-air bath while the housing of the device was exposed to ambient temperature conditions. Table I summarizes the results of the experimental comparison of these cells. The response of the two probe designs at various temperature gradients between the control fluid (heated water) and the corrodent (air bath) is set out for each test.

Table I

| Test No. | Temp of Hot Air, °F. | Prior Art Cell | | Test-Panel-Type Cell | | Remarks |
| --- | --- | --- | --- | --- | --- | --- |
| | | Corrosion Meter Reading | Control Fluid Temp., °F. | Corrosion Meter Reading | Control Fluid Temp., °F. | |
| 1 | 92 | 625 622 | 88 | 218.5 219 | 88 | Probes at ambient temp. |
| 2 | 93 | 607–610 | 116 | 216 | 116 | Fluctuations in H₂O temp. caused rapid changes in embedded reference-type probe. |
| 3 | 93 | 615–618 | 110 | 216 | 110 | |
| 4 | 96 | 578–585 | 172 | 200–202 | 175 | |
| 5 | 141 | 586 | 166 | 209 | 168 | |
| 6 | 167 | 580 | 172 | 210 | 184 | |
| 7 | 170 | 587 | 161 | 218 | 162 | |
| 8 | 165 | 659 | 68 | 242 | 68 | Readings immediately after turning heat off water, not in equilibrium. |
| 9 | 165 | 625 | 68 | 242 | 68 | Same after 10 minutes. |

The corrosion-meter readings are arbitrary numbers, the absolute values of which have no particular significance, but are determined by the electrical features of the corrosion-measuring elements, lead wires, etc., which are connected to the corrosion meter. Extent of corrosion is measured by the extent of change of meter reading over a period of time. Where no corrosion in fact occurs, the meter readings should be identical before and after the test. In the foregoing experiments, the extent of corrosion of the test elements exposed to the hot air bath was too minute to produce any detectable change in corrosion-meter reading. Accordingly, the changes in meter reading observed are indicative of the error of the corrosion-test device and meter system. It will be noted that in using both the prior art cell and the sandwich-type cell of this invention, in which the test and compensating elements are arranged in a test panel and separated by strips of insulating tape, absolute accuracy was not obtained. It will be observed, however, that upon change of temperature of either the air bath or of the corrodent control fluid, the change in corrosion-meter reading was only about one-third as great when the test-panel-type cell of this invention was employed. It will further be noted that fluctuations in control-fluid temperature caused rapid changes in meter reading, amounting to about three units in the case of the prior art cell, whereas there was no detectable fluctuation when the test-panel-type cell of this invention was employed. A comparison of runs 8 and 9, which were conducted at identical air-bath and control-fluid temperatures, demonstrates the rapid response of the device of this invention in reaching thermal and electrical equilibrium upon change in temperature, as compared to the prior art cell.

The foregoing tests were made beginning at ambient temperatures and proceeding in step-like fashion to obtain the temperature conditions set out in the table. By comparing successive runs, the response of the prior art cell and the cell of this invention to change of environment may be observed.

While the corrosion-test device of this invention was described with reference to a specific embodiment, it will be evident that certain modifications thereof will be obvious to those skilled in the art. For example, the housing 10 need not be fabricated of a plastic, non-conductive material, provided suitable means are employed to insulate the electrical terminals from the housing. Similarly, cover plate 34 may be fabricated of a conductive metal if a suitable gasket is provided to insulate the test element from the cover plate. The insulating layers of the test panel may be made of any electrically and thermally insulating material. The test and compensating elements may be made of any conductive, corrodible material of interest. The elements may be fabricated in accordance with the instructions in the afore-named U.S. patents and patent applications.

The embodiments of the invention in which an exclusive property or privilege is claimed are defined as follows:

1. A corrosion-test device comprising a hollow housing having an opening in one side thereof, fluid inlet and outlet means communicating with the interior of said housing, and a test panel attached across said opening to define a chamber within said housing, said test panel comprising a sheet-like, elongated, electrically conductive, corrodible test element, a sheet-like, elongated, compensating element having a temperature-resistance characteristic substantially the same as that of said test element, a thin layer of electrically insulating material disposed between the flat surfaces of said test element and compensating element to separate the same, and a second layer of electrically insulating, corrosion-resistant material disposed on the surface of said compensating element opposite from said test element, said test element, compensating element, and layers being arranged in sandwich-like configuration to form said panel, and being attached to said housing with said test element external thereto.

2. A device in accordance with claim 1 in which said elongated test element and compensating element are electrically connected in a common junction at one end of said panel, and including a first conductor connected to said common juncture, and second and third conductors connected respectively to the other ends of said test and compensating elements.

3. A test panel comprising a sheet-like, conductive, corrodible test element having an elongated body portion with a contact end and a protuberance at the other end thereof, a thin layer of electrically insulating adhesive material secured against the body portion of said test element, said insulating material extending over said body portion from inside said contact end, a compensating element having a temperature-resistance characteristic substantially the same as that of said test element having an elongated body portion with a contact end and a protuberance at the other end thereof, said compensating element being secured against said layer of insulating material in substantially parallel relation with said test element and with its contact end extending beyond said layer of insulating material adjacent to the contact end of said test element, said protuberances being on opposite sides of the respective ends of said panel and being spaced from each other, and a second layer of electrically insulating adhesive material secured against said compensating element and extending substantially coextensively with said first-mentioned layer.

4. An apparatus in accordance with claim 3 in which said test element and compensating element are substantially identical in dimensions and composition.

5. A corrosion-test device comprising a hollow housing having an elongated opening in one side thereof, fluid inlet and outlet means communicating with the interior of said housing, two electrical terminals supported adjacent to one end of said elongated opening in transversely aligned relationship therewith, an electrical terminal supported adjacent to the other end of said elongated opening, a flat, slotted, cover plate extending over the surface of said housing encompassing said opening, and means for securing said cover plate against said housing such that the slot in said cover plate substantially registers with said opening.

6. An apparatus in accordance with claim 5 including a test panel disposed between said housing and cover plate and compressed therebetween, said test panel comprising a sheet-like, conductive, corrodible test element having an elongated body portion with a contact end and a protuberance at the other end thereof, a thin layer of electrically insulating material secured adjacent to the body portion of said test element, said insulating material extending over said body portion from inside said contact end, a compensating element having a temperature-resistance characteristic substantially the same as that of said test element having an elongated body portion with a contact end and a protuberance at the other end thereof, said compensating element being secured against said layer of insulating material in substantially parallel relationship with said test element and with its contact end extending beyond said layer of insulating material adjacent to the contact end of said test element, said protuberances being on opposite sides of the respective ends of said elements and being spaced from each other, and a second layer of electrically insulating material secured against said compensating element and extending substantially coextensively with said first-mentioned layer, said test panel being disposed between said housing and cover plate such that said second layer of insulating material provides a closure for said opening in the housing, said protuberances respectively making electrical connection with said two transversely aligned terminals, and the contact end of said compensating element making electrical connection with said third terminal.

7. An apparatus in accordance with claim 6 in which said insulating material is an adhesive material.

8. An apparatus in accordance with claim 7 in which said test and compensating elements are of the same composition and are fabricated to substantially the same dimensions.

9. An apparatus in accordance with claim 8 in which said housing and said cover plate are fabricated of electrically insulating, corrosion-resistant materials.

References Cited in the file of this patent
UNITED STATES PATENTS

| | | |
|---|---|---|
| 2,518,941 | Satchwell et al. | Aug. 15, 1950 |
| 2,830,265 | Ellison | Apr. 8, 1958 |
| 2,982,930 | Wygant | May 2, 1961 |